United States Patent [19]

Gill

[11] 4,238,287
[45] Dec. 9, 1980

[54] EXTENDED NIP PRESS WITH TRANSVERSE STIFFENING MEANS IN THE BELT

[75] Inventor: Michael L. Gill, Beloit, Wis.

[73] Assignee: Beliot Corporation, Beloit, Wis.

[21] Appl. No.: 33,708

[22] Filed: Apr. 26, 1979

[51] Int. Cl.³ .............................................. D21F 3/02
[52] U.S. Cl. .................................... 162/358; 162/361
[58] Field of Search ...................... 162/358, 205, 361; 428/113, 295; 100/118, 153; 74/23 R, 237; 198/847; 152/DIG. 14

[56] References Cited

U.S. PATENT DOCUMENTS

| | | | |
|---|---|---|---|
| 3,181,690 | 5/1965 | Jenkins | 198/847 |
| 3,616,832 | 11/1971 | Shima et al. | 428/295 |
| 3,726,753 | 4/1973 | Marzocchi et al. | 428/295 |
| 3,853,698 | 12/1974 | Mohr | 162/358 |

Primary Examiner—William F. Smith
Attorney, Agent, or Firm—Dirk J. Veneman; Michael L. Gill; Gerald A. Mathews

[57] ABSTRACT

A press section of extracting water from a continuous traveling web such as paper in which the web is sandwiched between a traveling belt and a drum. The belt is wrapped partially about the drum and a pressure shoe exerts pressure on the belt in the wrap area to press the web. The belt includes a reinforcing structure for resisting longitudinal tension and a special transverse stiffening member including two layers of wire cords extending transversely with respect to the belt.

16 Claims, 5 Drawing Figures

EXTENDED NIP PRESS WITH TRANSVERSE STIFFENING MEANS IN THE BELT

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to presses for extracting water from a continuous traveling web and particularly to such a press section for extracting water from a newly formed web of paper in a papermaking machine. More particularly it relates to an extended nip press structure and an endless belt utilized in such press structure.

While the present invention relates to dewatering of a continuously running web of any material, it will be described herein with respect to the specific process of dewatering a web of paper. In the papermaking process, the web is formed by depositing the slurry of pulp fibers on a traveling wire. A large portion of the water is normally extracted from the web in the forming area by gravity or suction. The web then passes through what is known as a press section which normally would involve a series of nips of pairs of roll couples in which a substantial amount of the remaining water is squeezed out. The web will then pass on to a drying section which normally is composed of a series of heated drums to drive water off by vaporization. The web then finally passes to such finishing operations as calendering, coating, slitting, winding, et cetera.

The present invention relates specifically to a particular type of press section wherein the pressing operation in each unit is extended in time and thereby results in the extraction of significantly more water than in the heretofore nip of a roll couple. This extended nip pressing is accomplished by wrapping an endless belt about an arc of a rotating drum. The web is sandwiched between the endless belt and the drum and may have a traveling felt on one or both sides thereof for absorbing the water from the web. Additional pressure is provided to the arc of constant area by means of a pressure shoe located on the side of the belt opposite the drum.

The principles and advantages of extended nip pressing have been discussed in U.S. Pat. Nos. 3,798,121 and 3,853,698, both of which are assigned to the assignee of this invention. These principles and advantages, therefore, need not be discussed herein. The present invention, however, is related to an extended nip press of the type disclosed in U.S. Pat. No. 3,853,698 wherein a pressure shoe is located on the side of the belt opposite the drum to generate high pressing forces against the web. This is to be distinguished from the type disclosed in aforesaid U.S. Pat. No. 3,798,121 in which the pressure is provided by tension in one or more belts as they pass about the drum.

In the operation of such extended nip press sections having a pressure shoe, a problem has evolved wherein a bulge or bow forms ahead of the nip. The exact phenomenon which causes this bow or bulge is not fully understood. It is clear, however, that center portion of the endless belt in the area of the shoe is compressed, heated by the oil and friction and is otherwise worked differently than the rather wide edges of the belt. The bulge will sometimes be centered on the belt and at other times will be off to one lateral side of the belt. It will sometimes appear on the downstream side of the shoe on the laterally opposite side of the belt relative to a bulge on the upstream side of the belt. Experience thus far shows that the bulge is always confined in lateral directions to the shoe area.

Needless to say, this bulge in the belt is undesirable for many reasons, among which is the fact that it can cause wrinkling or creasing of the web. While the bulge can be eliminated by increasing the tension on the belt, this is not fully satisfactory since it causes increased loading on belts, shafts, bearings and drives. This in turn results in a decrease in the service life of such components and an increase in power consumption and down time.

The complexity of the operating conditions renders a solution to the problem evasive. Presently, pressure shoes having a 10 inch arc of contact and pressures of 600 pounds per square inch are utilized in experimental machines. This means that the belt is subjected to 6,000 pounds of normal force for every inch of width of the belt in the shoe area. Further, it is contemplated that pressures may be increased to 900 pounds per square inch or above and arcs of contact might be increased to as much as 20 inches or more. A 20 inch arc of contact and shoe pressures of 900 psi would result in 18,000 pounds of normal force for each inch of width of the belt in the shoe area.

Further, since the belt is in sliding contact with the shoe and under extremely high pressure, significant heat can be generated due to the sliding friction. The hydraulic fluid in the shoe is maintained at 140 degrees Fahrenheit (46 degrees Centigrade) to maintain the proper viscosity. With the heat caused by the sliding friction and hysteresis losses in the belt added to the heat from the oil, it is believed that belt temperatures may approach 200 degrees Fahrenheit (79 degrees Centigrade).

In co-pending U.S. patent application Ser. No. 33,707 filed Apr. 26, 1979, by Dennis C. Cronin (assigned to the same assignee at this invention) it is suggested that longitudinally extending cords be provided only in the area of the belt which passes through the pressure shoe area. It is further noted in said co-pending application that by providing such longitudinals cord in the shoe area only, a substantial reduction in the tension required to eliminate the bulge is realized.

In my co-pending application U.S. Ser. No. 33,709 filed Apr. 26, 1979, relating to an extended nip press section for papermaking machines (assigned to the same assignee of this invention) it is proposed that the longitudinal reinforcing structure be comprised of at least a pair of layers of cords extending respectively at equal but opposite small angles with respect to the longitudinal direction of the belt. In my said co-pending application, it is noted that if the cord angle with respect to longitudinal direction is low and the modulus elasticity of the cords is sufficiently high, proper circumferential resistance can be accomplished and at the same time possible side to side variations and tensions throughout the shoe area can be balanced.

In accordance with the present invention, a transverse stiffening system is provided which resists bending which is required to form a bulge ahead of the shoe area. Specifically, one layer of wire cords will not significantly resist bending of the plane of the cords about an axis perpendicular to the cords. However, if two layers of wire cords are vulcanized together in a rubber matrix, they will effectively resist bending of the plane of the layer of cords about an axis perpendicular to the cords. In other words, the wires being substantially inextensible and incompressible will act in the nature of the webs in an I-beam and resist a bending moment.

Therefore, in accordance with the present invention, in addition to the circumferential tension resisting members in the belt, a transverse stiffening system comprising two layers of substantially inextensible and incompressible cords are provided in the belt structure.

Other objects, advantages and features will become more apparent with the disclosure of the principles of the invention and it will be apparent that equivalent structures and methods may be employed within the principles and scope of the invention in connection with the description of the preferred embodiment and the teaching of the principles in the specification, claims and drawings.

DESCRIPTION OF THE PREFERRED EMBODIMENT

Figure 1:
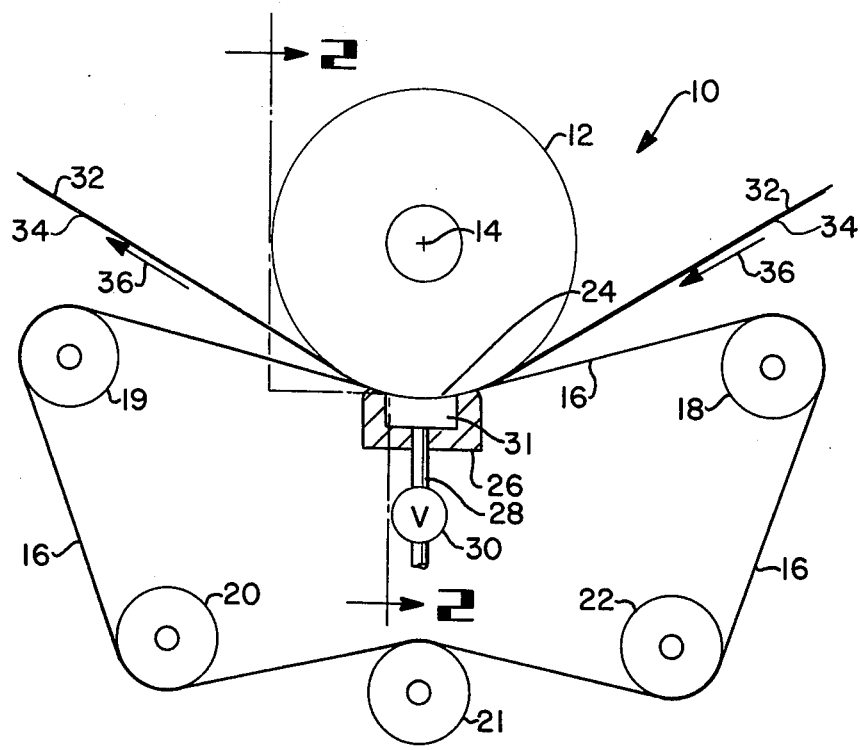
FIG. 1 is a schematic side view of a press section of a papermaking machine.

With reference to the drawing, and in particular FIG. 1, there is illustrated a schematic side elevational view of an extended nip press section 10 of a papermaking machine. The press section 10 includes a press roll 12 rotatable about an axis 14 which extends transversely of the press section. For purposes of this invention, lateral or transverse directions shall be directions which extend parallel to the rotational axis 14 of the press roll 12. Also, longitudinal or circumferential directions shall be directions which extend parallel to the direction of motion of the belt or web of paper.

A flexible endless belt 16 is trained about a plurality of pulleys 18 through 22 which are arranged in such a fashion with respect to the press roll 12 that the belt 16 wraps about a portion of the roll 12 to form an arcuate press area 24. One or more of the pulleys 18 through 22 are mounted in a known manner for movement in directions perpendicular to their respective rotational axis to permit installation of the belt 16 and adjustment of the tension in the belt 16.

An arcuate pressure shoe 26 is disposed adjacent the belt 16 on the side thereof opposite the roll 12 and press area 24. A force F is exerted on the pressure shoe by any suitable means to exert a pressure on the belt 18 in the press area. To insure even pressure P across the belt in this area, and minimize sliding friction, hydraulic pressure is supplied through a pipe 28 to a cavity 31. The pressure is regulated by means of a valve 30. The specific mechanical and hydraulic operation of the pressure shoe forms no part of the present invention and, therefore, will not be discussed herein in further detail. Further, although a pressure shoe 26 with a fluid cavity 31 is illustrated, it will be appreciated that a solid pressure shoe with an arcuate surface to mate with the roll 12 could be utilized. For a specific example of a pressure shoe, reference may be had to U.S. Pat. No. 3,853,698.

A felt 32 is trained about the press roll 12 and passes between the press roll 12 and the belt 16. A web of material 34 to be dewatered, is applied to the felt 32 and carried through the press area 24 in the direction of the arrows 36. While only one felt 32 is illustrated, it will be appreciated that a double felt system could be utilized wherein the web of paper or other similar material 34 is sandwiched therebetween.

Figure 2:
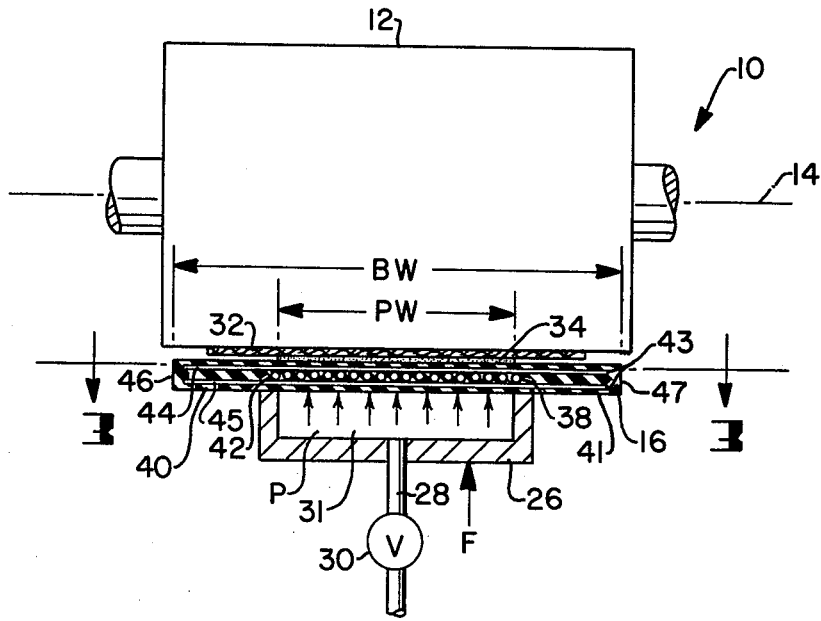
FIG. 2 is a partial cross-sectional view of the apparatus of FIG. 1 taken substantially along line 2—2 and illustrating the present invention.

As best seen in FIG. 2, the pressure shoe 26 is disposed in the transverse center area of the roll 12 and belt 16. The width PW of the pressure shoe is substantially less than the width BW of the belt and, therefore, exerts a pressure only over the center portion of the moving belt. This leaves the laterally outer portions 40,41 free of any normal force or pressure caused by the pressure shoe 26.

As discussed above, during the operation of such an extended nip press, a problem has arisen wherein a bulge or bow appears in the belt 16 on the ingoing side of the nip at various positions across the width PW of the pressure shoe. The bulge or bow can occur in a central location with respect to the shoe or at either lateral side of the shoe. Further, the bulge will sometimes appear at one lateral side of the shoe on the upstream side and at the opposite lateral side of the shoe on the downstream side. Attempts heretofore at eliminating this bulge have generally been directed to increasing the tension in the belt 16. While these attempts have successfully removed the bulge, they also result in undesirably increasing the forces and loads on the belt, bearings and drive.

Figure 3:
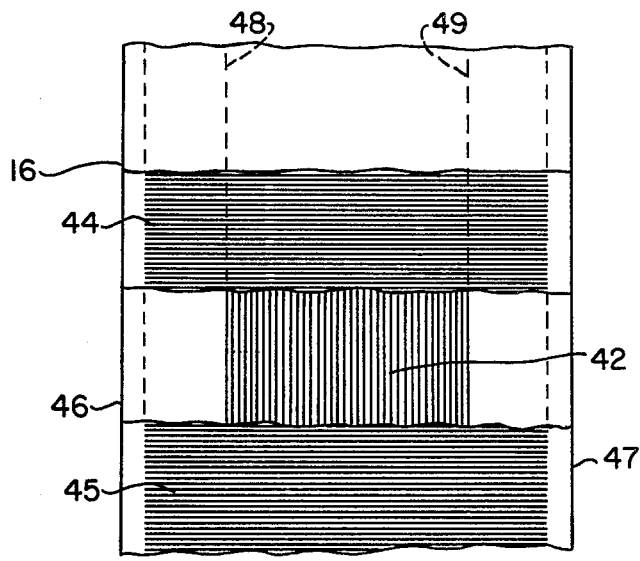
FIG. 3 is a partial sectional view of the apparatus of FIG. 1 taken substantially along line 3—3 of FIG. 2 with portions broken away to illustrate the reinforcing structure.

As seen in FIGS. 2 and 3, the belt 16 includes a reinforcing structure 38 extending circumferentially thereof. The belt structure 38 includes circumferential tension resisting means which in the embodiment illustrated comprises a ply 42 of circumferentially extending helically wound cords which is confined in lateral direction to the portion of the belt 16 which passes the area of the shoe 26. This reinforcing layer 42 is similar to the reinforcing layer disclosed and described in said co-pending application of Dennis C. Cronin and which according to said co-pending application permits a substantial reduction in the tension required to eliminate the bulge or bow in the belt 16. The disclosure of said copending application is incorporated herein by reference.

In accordance with the present invention an additional structure 43 for resisting the bulge or bow comprising two layers 44 and 45 of parallel wires cords extending transversely of the belt is provided. In the specific embodiment illustrated, the ply 42 of circumferentially extending cords are sandwiched between the two plies 44 and 45.

Since the cords in the layers 44 and 45 are made of wire and thus are substantially inextensible and incompressible, they effectively resist bending of the belt 16 in transverse directions. In other words the cords in the layers 44 and 45 act in a similar fashion to the webs on an I-beam to resist such bending. This resistance to bending, therefore, provides additional resistance to the formation of a bulge or bow which has heretofore formed ahead of the shoe 26.

Further, since the cords and the plies 44 and 45 run transversely of the belt and thus parallel to the rotational axis of the pulleys 18 through 22, there will be no resistance offered by such transverse wires to the bending of the belt about such pulleys. These wires will freely follow the contour of the pulleys much in the nature of tank tracks turning around the wheels of the tank drives.

Although in the specific embodiment illustrated, the plies 44 and 45 are located on opposite sides of the longitudinal or circumferential tension members 42, such plies 44 and 45 could be located both on the shoe side of the ply 42 or both on the felt side of the ply 42. Also, in the particular embodiment illustrated, the plies 44 and 45 extend substantially to the lateral edges 46 and 47 of the belt 16. It may be desirable, however, in some circumstances to have the plies 44 and 45 extend only to the lateral edges 48 and 49 of the shoe area.

Figure 4:
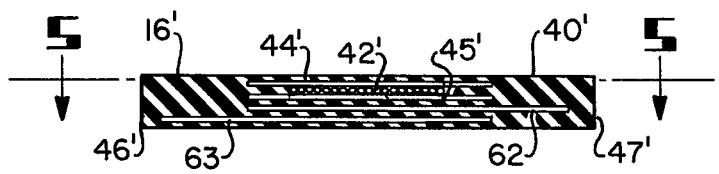
FIG. 4 is a view similar to FIG. 2 but only showing the belt to illustrate alternate embodiment of the present invention.
Figure 5:
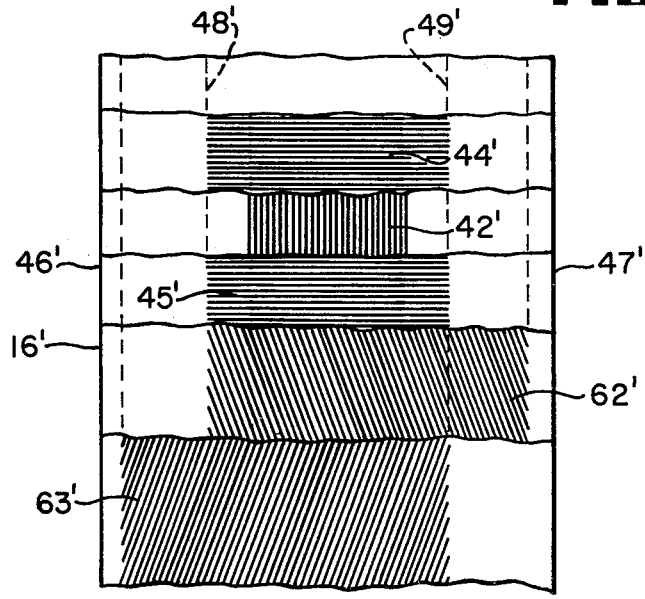
FIG. 5 is a view similar to FIG. 3 but taken along line 5—5 of FIG. 4.

In an alternate embodiment of the invention illustrated in FIGS. 4 and 5, a pair of layers of bias layed cords 62 and 63 similar to those disclosed in my co-pending application are provided in the belt 16'. Plies 62 and 63 are comprised of parallel cords extending at small equal but opposite angles with respect to the longitudinal direction of the belt 16. As discussed in further detail in my said co-pending application, the plies 62 and 63 form an overlap portion which is confined to the area passing adjacent to the shoe 26. Further, the ply 62 extends laterally beyond the edge 49' of the shoe area to the edge 47' of the belt 16 while the ply 63 extends laterally beyond the opposite edge 48' of the shoe area to the lateral edge 46' of the belt 16'. Further details of such bias ply reinforcement may be found in my said co-pending application which is incorporated herein by reference.

Also, as discussed in my co-pending application, it may be desirable to provide an additional layer 42' of circumferentially extending cords confined to the central area of the belt adjacent to the shoe. This ply 42' may be limited in width to between ¼th and ¾ths of the width of the shoe.

In accordance with the present invention, a pair of plies of transversely extending wire cords 44' and 45' are provided in the belt structure and extent at least substantially from the lateral edge 48' to the lateral edge 49' of the shoe. As discussed above, in some instances it may be desirable to have the plies 44' and 45' extend substantially to the laterally outer edges 46' and 47' of the belt 16'.

Further, it will be appreciated that while the transversely extending plies 44' and 45' encase the circumferentially extending cord ply 42', these plies 44' and 45' may be rotated in any sequence relative to the reinforcing layers 42', 62' and 63'.

Again, as noted above, the transverse wires or reinforcing members in the plies 44' and 45' are preferably of wire which is substantially inextensible and incompressible. These cords, however, may be made on any material having sufficient strength which is substantially inextensible and incompressible such that when coacting in a pair of layers as discussed above, they will effectively resist a bending moment.

The elastomers used in making the belt should be carefully chosen to provide low hysteresis loss to minimize heat build up. It must be resistant to high temperatures and compatible with whatever hot oil is used in the pressure shoe as well as water and common chemicals used in paper machines. Further, it should have good abrasion resistance and a low coefficient of friction since it will be subjected to sliding friction as it passes over the shoe. Suggested elastomers include acrylonitrile butadienes, ethylene acrylic copolymers, polyurethanes, fluorinated hydrocarbons and epichlorohydrin rubbers.

While a certain representative embodiment and details have been shown for the purpose of illustrating the invention, it will be apparent to those skilled in this art that various changes and modifications may be made therein without departing from the spirit or scope of the invention.

What is claimed is:

1. An extended nip press for removing water from a moving web of material, said press comprising:
   a rotatable roll having a cylindrical outer pressing surface;
   a flexible endless belt trained about a plurality of pulleys such that said belt turns about the pressing surface of said roll over an arc of contact;
   at least one movable felt means trained about said roll between said belt and said roll for carrying said web of material between said belt and said roll;
   a pressure shoe disposed on the side of said belt opposite said roll and adjacent said arc of contact, said shoe terminating in lateral directions substantially short of the lateral edges of said belt; and
   a reinforcing structure in said belt extending circumferentially thereof, said reinforcing structure comprising longitudinal tension resisting means and a pair of plies of parallel cords which are substantially incompressible and inextensible, said cords extending transversely of said belt and substantially across said pressure shoe so that said belt is substantially free of any bulging adjacent said shoe.

2. A press as claimed in claim 1 wherein said pair of plies extend substantially across said belt.

3. A press as claimed in claim 1 wherein the cords in said pair of plies are wire.

4. A press as claimed in claim 1 wherein said means is limited in lateral directions to the area of said shoe.

5. A press as claimed in claim 4 wherein said means comprises a ply of circumferentially extending cords.

6. A press as claimed in claim 4 wherein said means comprises a pair of plies of parallel cord fabric with the cords in the plies extending and equal but opposite angles of no greater than 25° with respect to the circumferential direction.

7. A press as claimed in claim 5 wherein the cords in said pair of plies are wire.

8. A press as claimed in claim 6 wherein the cords in said pair of plies are wire.

9. In a press of the type for removing water from a moving web of material and including a rotatable press roll, a flexible endless belt trained about an arc of said roll and an arcuate pressure shoe adjacent said roll, said shoe terminating in lateral directions substantially short of the lateral edges of said belt, the improvement comprising:
   a reinforcing structure in said belt extending circumferentially thereof, said reinforcing structure comprising longitudinal tension resisting means and a pair of plies of parallel cords which are substantially incompressible and inextensible, said cords extending transversely of said belt and substantially across said pressure shoe so that said belt is substantially free of any bulging adjacent said shoe.

10. The improvement claimed in claim 9 wherein said pair of plies extend substantially across said belt.

11. The improvement claimed in claim 9 wherein the cords in said pair of plies are wire.

12. The improvement claimed in claim 9 wherein said means is limited in lateral directions to the area of said shoe.

13. The improvement claimed in claim 12 wherein said means comprises a ply of circumferentially extending cords.

14. A press as claimed in claim 12 wherein said means comprises a pair of plies of parallel cord fabric with the cords in the plies extending and equal but opposite angles of no greater than 25° with respect to the circumferential direction.

15. The improvement claimed in claim 13 wherein the cords in said pair of plies are wire.

16. The improvement claimed in claim 14 wherein the cords in said pair of plies are wire.

* * * * *